(12) United States Patent
Gelissen et al.

(10) Patent No.: US 9,150,702 B2
(45) Date of Patent: Oct. 6, 2015

(54) LASER-MARKING ADDITIVE

(75) Inventors: Franciscus Wilhelmus Maria Gelissen, Selfkant-Suesterseel (DE); Franciscus Gerardus Henricus Van Duijnhoven, Mierlo (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 13/502,431

(22) PCT Filed: Oct. 25, 2010

(86) PCT No.: PCT/EP2010/006506
§ 371 (c)(1),
(2), (4) Date: Aug. 8, 2012

(87) PCT Pub. No.: WO2011/050934
PCT Pub. Date: May 5, 2011

(65) Prior Publication Data
US 2012/0298933 A1 Nov. 29, 2012

(30) Foreign Application Priority Data
Oct. 29, 2009 (EP) ..................................... 09174512

(51) Int. Cl.
| | |
|---|---|
| *F21V 9/00* | (2006.01) |
| *G02B 5/02* | (2006.01) |
| *G02C 7/10* | (2006.01) |
| *G02F 1/361* | (2006.01) |
| *G03B 11/00* | (2006.01) |
| *C08K 3/22* | (2006.01) |
| *B41M 5/26* | (2006.01) |
| *B29C 65/00* | (2006.01) |
| *B32B 37/00* | (2006.01) |
| *B32B 38/04* | (2006.01) |
| *B41M 5/00* | (2006.01) |
| *B44C 1/17* | (2006.01) |

(52) U.S. Cl.
CPC . *C08K 3/22* (2013.01); *B41M 5/267* (2013.01)

(58) Field of Classification Search
USPC ......... 106/418, 422, 425, 436, 450, 453, 455, 106/456, 461, 479, 481; 252/582; 423/263, 423/594.1, 594.7, 595, 598, 599, 600; 428/195, 195.1; 430/945; 524/430, 524/601, 606; 156/272.8
See application file for complete search history.

(56) References Cited

U.S. PATENT DOCUMENTS

| | | |
|---|---|---|
| 6,503,316 B1 | 1/2003 | Sakoske et al. |
| 6,903,153 B2 * | 6/2005 | Wessels et al. ............... 524/409 |
| 2003/0108723 A1 * | 6/2003 | Sakoske et al. ............... 428/195 |
| 2006/0148968 A1 | 7/2006 | Van Duijnhoven et al. |
| 2010/0092700 A1 * | 4/2010 | Carroll et al. ................. 427/597 |
| 2011/0034609 A1 | 2/2011 | Duijnhoven et al. |

FOREIGN PATENT DOCUMENTS

| | | | |
|---|---|---|---|
| CN | 1720296 | 1/2006 | |
| EP | 1190988 | 3/2002 | |
| JP | 05-254252 | 10/1993 | |
| JP | 2006-509099 | 3/2006 | |
| WO | 2004-050766 | 6/2004 | |
| WO | WO 2009/003976 | * 1/2009 | ............... B41M 5/26 |

OTHER PUBLICATIONS

International Search Report for PCT/EP2010/006506 mailed Jul. 13, 2011.
Written Opinion of the International Searching Authority mailed Jul. 13, 2011.

* cited by examiner

*Primary Examiner* — Bijan Ahvazi
(74) *Attorney, Agent, or Firm* — Nixon & Vanderhye P.C.

(57) ABSTRACT

This invention relates to a laser-marking additive wherein the laser-marking additive comprises a bismuth containing compound and a functionalized polymer having 0.01 to 50 wt % of functional groups, in which the weight percentage is based on the total amount of functionalized polymer and bismuth containing compound. The invention further relates to a method for preparation of such laser-marking additive, a laser-markable composition comprising such laser-marking additives and preparation thereof and molded parts comprising the laser-markable composition, as well as films made from the laser-markable composition.

16 Claims, No Drawings

LASER-MARKING ADDITIVE

This application is the U.S. national phase of International Application No. PCT/EP2010/006506 filed 25 Oct. 2010 which designated the U.S. and claims priority to EP 09174512.5 filed 29 Oct. 2009, the entire contents of each of which are hereby incorporated by reference.

This invention relates to a laser-marking additive, as well as a method of preparation thereof, a laser-markable composition comprising the laser-marking additive and preparation thereof. The invention also relates to molded parts comprising laser-markable compositions and films made from laser-markable compositions.

Laser-marking additives are known, and include for example antimony trioxide, as described in WO01/00719. However, antimony trioxide is under suspect of being carcinogenic and therefore antimony-free laser-marking additives are desired.

The object of the present invention is therefore to have a laser-marking additive which exhibits good laser-marking performance while having lower amounts of antimony.

It has surprisingly been found that a laser-marking additive which comprises a bismuth containing compound and a functionalized polymer having 0.01 to 50 wt % of functional groups, in which the weight percentage is based on the total amount of functionalized polymer and bismuth containing compound, exhibits good laser-marking performance while having lower amounts of antimony. This has been exemplified in examples which are listed below.

An additional advantage of the laser-marking additive according to the invention is that it is easily prepared. Another advantage is that the laser-marking additive according to the invention comprises less halogens and preferably is halogen-free.

Antimony-free laser-marking additives are known. EP1190988 for example describes laser-markable compounds comprising bismuth and at least one additional metal. US2007/02924 describes laser-markable compounds of the formula MOCl, in which M is either As, Sb or Bi, as well as $BiONO_3$, $Bi_2O_2CO_3$, $BiOOH$, $BiOF$, $BiOBr$, $Bi_2O_3$, $BiOC_3H_5O_7$, $Bi(C_7H_5O_2)_3$, $BiPO_4$, $Bi_2(SO_4)_3$ as additive. Many of these additives comprise halogens, which is undesirable. Another disadvantage is that certain matrix polymers in which Bismuth containing compounds are directly mixed show severe discoloration when high processing temperatures are used. It has been shown that temperatures above 220° C. show severe discoloration of the composition when matrix polymers such as polyesters and polyamides are used. This results in poor laser-marking performance. Without wishing to be bound by theory, the inventors believe that this is most probably caused by a reaction between the laser-marking additive and the matrix polymer resulting in degradation.

It has been found that laser-marking additives according to the invention do not show discoloration upon mixing with a matrix polymer.

One of the solutions found to disperse laser-marking additives in matrix polymers is described in WO2004/050766. This document describes microspheres having a core and a shell and a laser light absorber in which antimony is used. Microspheres as described in WO2004/050766 have the disadvantage that at least two carriers are needed, one for the core and one for the shell, before the microsphere is dispersed in the matrix polymer. Furthermore two processing steps are required to obtain the laser-marking additive which results in additional costs.

It has surprisingly been found that the laser-marking additive according to the invention can be easily prepared by melt-blending a bismuth containing compound with a functionalized polymer having 0.01 to 50 wt % of functional groups, in which the weight percentage is based on the total amount of functionalized polymer and bismuth containing compound. In this method one carrier is needed, which simplifies the process for preparation.

Another advantage of the laser-marking additive according to the invention is that the Comparative Tracking Index (hereafter CTI) of a laser-markable composition is less influenced when the laser-marking additive according to the invention is incorporated, as compared to compositions comprising antimony as laser-marking additive. Compositions comprising antimony have been shown to have a reduced CTI with respect to compositions that do not comprise antimony, while employing the laser-marking additive according to the invention hardly influences the CTI.

Preferably, the laser-marking additive is antimony-free, as antimony is under suspect of being carcinogenic.

Preferably, the laser-marking additive is halogen-free, as halogens are undesired.

Laser-marking additives according to the invention are incorporated in a matrix polymer to provide a laser-markable composition. The matrix polymer includes thermoplastic polymers, such as polyamides, polycarbonates and polyesters. Preferably the matrix polymer is a polyamide, such as PA6, PA66, PA46, PA4,10, PA6,10, PA11, PA12 or a polyester such as PET, PBT and PEN. The laser-marking additive is particularly advantageously melt-blended in matrix polymers that require a temperature above 220° C., as it has been shown that no discoloration of the laser-markable composition occurs at these temperatures.

Surprisingly it has been shown that the laser-markable additive when incorporated in a matrix polymer, can serve as a laser-markable masterbatch for any further thermoplastic polymer, including polyolefins, thermoplastic polyurethanes, polyamides, polycarbonates, styrenics and polyesters as long as the melting temperature of the further thermoplastic polymer is lower than the highest melting temperature of the matrix polymer.

Examples of polyamides include PA66, PA11, PA12, PA410, PA610, PA46. Examples of styrenics include Styrene Acrylonitrile (SAN), acrylonitrile butadiene styrene (ABS), polystyrene (PS) Examples of acrylics include Polymethylmethacrylate (PMMA), Polyhydroxyethylmethacrylate (HEMA). Examples of polyolefins include Polyethylene (PE), polypropylene (PP), ethylene propylene diene copolymers (EPDM), thermoplastic vulcanizates (TPV's) and copolymers thereof. Other examples include Ethylene methacrylate polymer (EMA), ethylene butyl acrylate copolymer (EBA), ethylene vinyl acetate copolymer (EVA), Maleic acid grafted PE and PP, Polyvinylchlorie (PVC), thermoplastic polyurethanes (TPU) Polyhydroxyalkanoates (PHA's), polylactic acid (PLA), Polycaprolacton (PCL).

The obtained composition is here also denoted as laser-markable composition. This has the advantage that the resolution of the laser-markable composition is further enhanced. For producing a laser-markable masterbatch preferably a polyamide or polyester is used as matrix polymer, more preferably polyamide-6 or PBT.

The present invention also relates to a method for processing of a laser-markable composition, in which the processing of the laser-markable composition is effected at a temperature of at least 220° C. This results in a composition that has good laser-marking performance, while showing less discoloration of the laser-markable composition.

The laser-markable composition might comprise additives, such as fillers, flame retardants, pigments etc. As whitener for the laser-markable composition various additives can be used, such as titane dioxide or zinc sulfide. The laser-marking additive according to the invention can advantageously be used in a composition which comprises zinc sulfide as whitener, as this allows the composition to be laser-marked by UV-lasers. Preferably, the laser-marking additive comprises aluminum to enhance the laser-marking performance.

The laser-marking additive is capable of absorbing laser light of a certain wavelength. In practice this wavelength lies between 157 nm and 10.6 micrometer, the customary wavelength range of lasers. If lasers with larger or smaller wavelengths become available, other absorbers may also be considered for application in the additive according to the invention. Examples of such lasers working in the said area are $CO_2$ lasers (10.6 micrometer), Nd:YAG lasers (1064, 532, 355, 266 nm) vanadat- and excimer lasers of the following wavelengths: $F_2$ (157 nm), ArF (193 nm), KrCl (222 nm), KrF (248 nm), XeCl (308 nm) and XeF (351 nm), FAYb fiber lasers, diode lasers and diode array lasers. Preferably Nd:YAG lasers and $CO_2$ lasers are used since these types work in a wavelength range which is very suitable for the induction of thermal processes that are applied for marking purposes.

Functionalized polymers are here understood to be polymers that have functional groups which can react with other functional groups.

Examples of suitable functional groups are carboxylic acid groups, anhydride groups, ester groups, salt groups, ether groups, epoxy groups, amine groups, alkoxy silane groups, alcohol groups or oxazoline groups. Preferably, the functional group is chosen from the group of maleic anhydride (MAH) or epoxy, as these groups have shown to show good laser performance in a laser-marking additive according to the invention.

Suitable polymers that can be provided with functional groups include for example polyolefins, elastomers, EP-rubbers, EPDM-rubbers and styrenic polymers.

Preferably, the polymer is a polyolefin. Examples of suitable polyolefins are ethylene polymers and propylene polymers. Examples of suitable ethylene polymers are all thermoplastic homopolymers of ethylene and copolymers of ethylene with as comonomer one or more a-olefins with 3-10 C-atoms, in particular propylene, isobutene, 1-butene, 1-hexene, 4-methyl-1-pentene and 1-octene, that can be prepared using the known catalysts such as for example Ziegler-Natta, Philips and single-site catalysts. The quantity of comonomer as a rule lies between 0 and 50 wt. %, and preferably between 5 and 35 wt. %. Such polyethylenes are known as high-density polyethylene (HDPE), low-density polyethylene (LDPE), linear low-density polyethylene (LLDPE), linear very low-density polyethylene (VL (L) DPE) and plastomers.

Examples of suitable propylene polymers are homopolymers of propylene, random copolymers, copolymers and single-site polymers.

The functional groups may be present in the polymer intrinsically, such as in copolymers, but may also be present due to grafting. Suitable polymers in which a functional group is intrinsically present include for example ethylene vinyl acetate (EVA), ethylene methylacrylate (EMA), ethylene butylacrylate (EBA), poly vinyl acetate (PVA), poly glycidyl methacrylate (PGMA), styrene maleic anhydride (SMA) and ionomers.

Preferably, the functional group is present in the polymer by grafting an ethylenically unsaturated functionalised compound on the polymer.

Suitable ethylenically unsaturated functionalised compounds are those which can be grafted on at least one of the aforesaid suitable polymers. The ethylenically unsaturated functionalised compounds contain a carbon-carbon double bond and can form a side branch on a polymer by grafting thereon.

Examples of suitable ethylenically unsaturated functionalised compounds are the unsaturated carboxylic acids and esters and anhydrides and metallic or non-metallic salts thereof. Preferably the ethylenic unsaturation in the compound is conjugated with a carbonyl group. Examples are acrylic, methacrylic, maleic, fumaric, itaconic, crotonic, methyl crotonic and cinnamic acid and esters, anhydrides and possible salts thereof. Of the compounds with at least one carbonyl group, maleic anhydride is preferred.

Examples of suitable ethylenically unsaturated functionalised compounds with at least one epoxy ring are, for example, glycidyl esters of unsaturated carboxylic acids, glycidyl ethers of unsaturated alcohols and of alkyl phenols and vinyl and allyl esters of epoxy carboxylic acids. Glycidyl methacrylate is particularly suitable.

Examples of suitable ethylenically unsaturated functionalised compounds with at least one amine functionality are for example allyl amine, propenyl, butenyl, pentenyl and hexenyl amine, amine ethers, for example isopropenylphenyl ethylamin ether. The amine group and the unsaturation should be in such a position relative to each other that they do not influence the grafting reaction to any undesirable degree.

The amines may be unsubstituted but may also be substituted with for example alkyl and aryl groups, halogen groups, ether groups and thioether groups.

Examples of suitable ethylenically unsaturated functionalised compounds with at least one alcohol functionality are all ethylenically unsaturated compounds with a hydroxyl group that may or may not be etherified or esterified, for example allyl and vinyl ethers of alcohols such as ethyl alcohol and higher branched and unbranched alkyl alcohols as well as allyl and vinyl esters of alcohol substituted acids, preferably carboxylic acids and C3-C8 alkenyl alcohols.

In a preferred embodiment the functionalized polymer is chosen from the group of grafted polyolefin and poly (glycidyl methacrylate). More preferred the functionalized polymer is a grafted polyethylene or grafted polypropylene. Preferably the polyethylene or polypropylene is grafted with an ethylenically unsaturated functionalized compound.

The functionalized polymer has 0.01 to 50 wt % of functional groups, in which the weight percentage is based on the total amount of functionalized polymer and bismuth containing compound. Preferably the functionalized polymer has at least 0.05 wt % functional groups and more preferably at least 0.1 wt % functional groups, in which the weight percentage is based on the total amount of functionalized polymer and bismuth containing compound. Preferably the functionalized polymer has at most 40 wt % of functional groups, more preferably at most 30 wt % and even more preferably at most 20 wt % of functional groups, in which the weight percentage is based on the total amount of functionalized polymer and bismuth containing compound.

Bismuth-containing compounds are known to a person skilled in the art, and are for example described in US2007/02924. A Bismuth-containing compound is here understood to include bismuth-salts, bismuth-oxides etc. The compounds can, for example, be chosen from the group of $BiONO_3$, $Bi_2O_2CO_3$, $BiOOH$, $BiOF$, $BiOBr$, $Bi_2O_3$, $BiOC_3H_5O_7$, $Bi(C_7H_5O_2)_3$, $BiPO_4$, $Bi_2(SO_4)_3$, and Bi-citrate. The Bismuth-containing compound is preferably halogen-free, as halogens are undesirable. More preferably, the Bismuth-containing compound is Bi-citrate, as Bi-citrate is halogen-free. Most preferred is $Bi_2O_3$ as Bismuth-containing compound, as $Bi_2O_3$ is halogen free, has a light color hence little influence on background color and gives high contrast at highest marking speed compared to other Bi-containing compounds.

In the present invention the bismuth-containing compound is present in the functionalized polymer in an amount of between 0.1 wt % and 95 wt %, more preferably between 5 and 80 wt % and most preferable between 50 and 80 wt %, based on the total amount of functionalized polymer and bismuth containing compound. To choose a suitable concentration the person skilled in the art will principally be guided by the desired amount of the laser-marking additive in the matrix polymer.

It is even possible that the amount of bismuth is as low as 500 ppm in the laser-markable composition to obtain good resolution, or even as low as 250 ppm. Preferably, the amount of Bismuth in a laser-marking composition is between 0.05 to 2 wt %, based on the total weight of the composition. This gives good laser-marking performance while retaining the mechanical properties of the composition.

The present invention also relates to a method for preparation of a laser-marking additive wherein the functionalized polymer is melt-blended with the bismuth-containing compound. This method offers the advantage of only involving one processing step.

The present invention also relates to a method for processing a laser-markable Composition according to the invention in which the processing is effected at a temperature of at least 220° C. This processing results in less degradation of the matrix polymer.

The present invention also relates to molded parts comprising the laser-markable composition. These parts are for example circuit breakers or lamp holders. The parts show good laser-marking performance.

The present invention also relates to films made from the laser-markable composition. These films show high laser-marking performance.

The invention will be elucidated on the basis of the following examples.

In the Examples and Comparative Experiments the following materials are used:
As the absorber(s) in the laser-marking additive:
A-1 Bismuth oxide $Bi_2O_3$
A-2 Antimony tin oxide
A-3 Antimony tri oxide
As polymer in the laser-marking additive (LMA)
P1 LLDPE grafted with 0.26 wt. % MAH relative to the functionalised polymer.
P2 Fusabond ® M0525D (Dupont), which is a polyethylene grafted with 0.9 wt. % MAH, relative to the functionalized polymer.
P3 LLDPE, which is a copolymer of ethylene and octene with a meltindex of 30.
As polymer in the laser-markable masterbatch (LMB)
P4 HDPE
As the matrix polymer in the laser-markable composition (LMC)
M-1. Akulon® K222-KGV4 from DSM: PA-6, 20% Glass fiber reinforced, comprises flame retardant and is halogen and phosphorous free.
M1-1 Polyamide 6 compound, 20% Glass fiber reinforced, comprises flame retardant and is halogen and phosphorous free.
M-1.2. Polyamide 6, 25% Talcum filled/reinforced, comprises flame retardant and is halogen and phosphorous free.
M-2 Polybutylene terephthalate (PBT) 1060 DSM
M-2.1 Polybutylene terephthalate 20% Glass fiber reinforced.
M-2.2 Polybutylene terephthalate 20% Glass fiber reinforced, comprises flame retardant and is halogen and phosphorous free.
M-3 TPE Thermoplastic co-polyether ester elastomer All amounts are in parts per weight, except where stated otherwise.

Method of Preparation Laser-Marking Additive (LMA)

Using a twin-screw extruder (ZSK 30 of Werner & Pfleiderer) a number of laser-marking additives, LMA01-LMA04 were produced, as well as a comparative example. The composition of the LMAs are given in Table 1. The screw speed was 250 rounds per minute and the throughput 20 kg/h. Temperature was 140° C. at zone 1 and 160° C. at zone 10.

TABLE 1

| | Laser-marking additive | | | | |
|---|---|---|---|---|---|
| Compound | LMA01 | LMA02 | LMA03 | LMA04 | Comparative LMA_A |
| Polymer | P1 95 | P1 50 | P2 95 | P2 50 | P3 50 |
| Absorber | A1 5 | A1 50 | A1 5 | A1 50 | A1 50 |

Method of Preparation Laser-Markable Composition (LMB)

Laser-marking compositions were produced on using a twin-screw extruder (ZSK 30 of Werner & Pfleiderer). The composition of the LMBs and the processing conditions are given in Table 1.1

The screw speed was 250 rounds per minute at a throughput of 10 kg per hour. From zone 1 to 10 the temperature was equal at 280° C.

TABLE 1.1

| Laser-marking master-batch | |
|---|---|
| Compound | LMB01 |
| LMA02 | 25 |
| M1 | 25 |
| P4 | 47.5 |
| P2 | 2.5 |
| Tmelt [° C.] | 280 |

Method of Preparation Laser-Markable Composition (LMC)

Laser-marking compositions were produced on using a twin-screw extruder (ZSK 30 of Werner & Pfleiderer). The composition of the LMCs and the processing conditions are given in Table 2.

The screw speed was 250 rounds per minute at a throughput of 15 kg per hour. The temperature in zone 1 was 190° C. for polyamide (M-1,M-1.1, M-1.2) as matrix, and 230° C. for polybutylene terephtalate (M-2, M-2.1.M2.2) as matrix. The temperature in zone 10 was 280° C. for the matrix polymers compositions based on polyamide and polybutylene terephtalate (M-1, 1.1 M-2 M2.1 and M2.2). For the TPE Thermoplastic co-polyether ester elastomer (M-3) the temperature in zone 195° C. The temperature in zone 10 was 240° C.

TABLE 2

Laser-markable composition (LMC) and processing conditions

| Compound | LMC01 | LMC02 | LMC03 | LMC04 | Comparative Example 1 | Comparative Example 2 | Comparative Example 3 | Comparative Example 4 |
|---|---|---|---|---|---|---|---|---|
| Laser-marking additive: | LMA02 2 | LMA02 1 | LMA02 0.5 | LMA02 2 | $Bi_2O_3$ 0.25 | $Bi_2O_3$ 0.25 | LMA_A 2 | LMA_A 2 |
| Matrix polymer: Polyamide M-1 | 98 | 99 | 99.5 | | 99.75 | | 98 | |
| Matrix polymer: PBT M-2 | | | | 98 | | 99.75 | | 98 |
| T melt [° C.] | 300 | 300 | 301 | 300 | 280 | 280 | 300 | 300 |
| Torque [%] | 68 | 67 | 67 | 59 | n.a. | n.a. | n.a. | n.a. | n.a. = not available; all amounts given in wt %, based on the total amount laser-markable composition.

TABLE 2-1

Laser-markable composition (LMC) and processing conditions

| | | LMC05 | LMC06 | LMC07 | LMC08 | LMC09 |
|---|---|---|---|---|---|---|
| Matrix polymer: | M-1.1 | 100 | 99 | 99.5 | 99.75 | 99 |
| LMA: | LMA02 | | 1 | 0.50 | 0.25 | |
| LMA: | LMA04 | | | | | 1 |
| Temp. [° C.] | | | | 280-290 | | |

TABLE 2-2

Laser-markable composition (LMC) and processing conditions

| | | LMC10 | LMC11 | LMC12 | LMC13 | LMC14 |
|---|---|---|---|---|---|---|
| Matrix polymer: | M-1.2 | 100 | 99 | 99.5 | 99.75 | 99 |
| LMA: | LMA02 | | 1 | 0.5 | 0.25 | |
| LMA: | LMA04 | | | | | 1 |
| Temp. [° C.] | | | | 280-300 | | |

TABLE 2-3

Laser-markable composition (LMC) and processing conditions

| | | LMC15 | LMC16 | LMC17 | LMC18 | LMC19 | LMC20 | LMC21 |
|---|---|---|---|---|---|---|---|---|
| Matrix polymer | M-2.1 | | | | 99 | 99.5 | 99.75 | 99 |
| | M-3 | 98 | 99 | 99.5 | | | | |
| LMA: | LMA02 | 2 | 1 | 0.5 | 1 | 0.5 | 0.25 | |
| LMA | LMA04 | | | | | | | 1 |
| Temp. [° C.] | | | 240-250 | | | 280-300 | | |

TABLE 2-4

Laser-markable composition (LMC) and processing conditions

| | | LMC22 | LMC23 | LMC24 | LMC25 |
|---|---|---|---|---|---|
| Matrix polymer: | M-2.2 | 99 | 99.5 | 99.75 | 99 |
| LMA: | LMA02 | 1 | 0.5 | 0.25 | |
| LMA: | LMA04 | | | | 1 |
| Temp. [° C.] | | | 280-290 | | |

TABLE 2-4-continued

Laser-markable composition (LMC) and processing conditions

| | | LMC26 | LMC27 | LMC28 |
|---|---|---|---|---|
| further polymer: | P4 | 92 | 97 | 96 |
| LMB: | LMB01 | 2 | 3 | 4 |
| Temp. [° C.] | | | 180-190 | |

Al blends (LMC01 to LMC28), resulted in a composition, in which the presence of the laser-marking additive did hardly have any effect on the colour. Comparative Example 1 and 2, however, resulted in severe discoloration, and could no longer be processed into laser-markable samples. Also Comparative Examples 3 and 4 showed severe discoloration upon mixing with the matrix polymer, and could no longer be processed into laser-markable samples, due to degradation of the matrix polymer.

Preparation of Laser-Marking Samples

From the laser-markable composition samples were produced using injection moulding. The temperature in zone 1 was set to 215° C. for all samples. The temperature of zone 2, zone 3 and the nose were all 225° C. for the samples with polyamide as matrix polymer and 230° C., 240° C. and 240° C. respectively, for the sample with PBT as matrix polymer. For the sample with TPE (M-3) as matrix polymer the temperature in zone 1 was set 200° C. for all samples and 210° C., 230° C. and 240° C. in zone 2,3 and the nose.

Laser-Marking Performance

Laser-marking evaluations were performed with a diode-pumped Trumpf VMc3 laser system. So-called evaluation matrices were marked. In such matrices, the marking speed (v [mm/sec]) and frequency (f [kHz]) are varied at given power (p [%]), focal distance (z=0 [in focus] or 6 mm above the sample) and line spacing. Basically the evaluation matrices indicate which contrast can be obtained at certain marking speed with varying laser parameters. An evaluation of the laser-marking performance with respect to contrast and marking speed in terms ranging from excellent (+++++) to poor (-----) is given in Table 3.

TABLE 3

Assessment of the laser-marking performance of the LMSA at a laser power of 40% and a line speed of 3000 mm/min

| Sample | Sample description | Bi$_2$O$_3$ content in weight percentage[1] | Marking performance Focus distance [+ mm] 0 | 6 |
|---|---|---|---|---|
| Comparative Example | matrix polymer: M1; 1% A-2 4% A-3 | 0.00 | ++--- | +---- |
| LMC01 | matrix polymer: M1 | 1 | +++++ | +++++ |
| LMC03 | matrix polymer: M1 | 0.25 | +++++ | -++++ |
| LMC04 | matrix polymer: M2 | 1 | +++++ | -++++ |
| LMC05 | M-1.1 | 0.000 | [++----] | [+-----] |
| LMC06 | M-1.1 | 0.500 | [+++++] | [+++++] |
| LMC07 | M-1.1 | 0.250 | [+++++] | [+++++] |
| LMC08 | M-1.1 | 0.125 | [++++] | [++++] |
| LMC09 | M-1.1 | 0.500 | [+++++] | [+++++] |
| LMC10 | M-1.2 | 0.000 | [++----] | [+-----] |
| LMC11 | M-1.2 | 0.500 | [+++++] | [+++++] |
| LMC12 | M-1.2 | 0.250 | [+++++] | [+++++] |
| LMC13 | M-1.2 | 0.125 | [++++] | [++++] |
| LMC14 | M-1.2 | 0.500 | [+++++] | [+++++] |
| LMC15 | M-3 | 1.000 | [+++++] | [+++++] |
| LMC16 | M-3 | 0.500 | [+++++] | [+++++] |
| LMC17 | M-3 | 0.250 | [+++++] | [+++++] |
| LMC18 | M-2.1 | 0.500 | [+++++] | [+++++] |
| LMC19 | M-2.1 | 0.250 | [+++++] | [+++++] |
| LMC20 | M-2.1 | 0.125 | [++++] | [++++] |
| LMC21 | M-2.1 | 0.500 | [+++++] | [+++++] |
| LMC22 | M-2.2 | 0.500 | [+++++] | [+++++] |
| LMC23 | M-2.2 | 0.250 | [+++++] | [+++++] |
| LMC24 | M-2.2 | 0.125 | [++++] | [++++] |
| LMC25 | M-2.2 | 0.500 | [+++++] | [+++++] |
| LMC26 | P-4 | 0.500 | [++++] | [++++] |
| LMC27 | P-4 | 0.250 | [+++++] | [+++++] |
| LMC28 | P-4 | 0.125 | [++++] | [++++] |

[1]with respect to the total amount of laser-markable composition.

The results described in Table 3 clearly indicate that laser-markable samples, comprising a bismuth containing compound show very good marking performance, even better than the comparative example which uses antimony compounds as laser-marking additive.

Comparative Tracking Index

CTI values were measured according to IEC 60112 for laser-markable compositions comprising the laser-marking additive according to the invention, as well as a comparative example that comprises antimony. The CTI-value for the matrix polymer without laser-marking additive is given as well. The results are summarized in Table 4.

TABLE 4

Assessment of CTI values

| Sample | Matrix polymer: | Bi$_2$O$_3$ content in weight percentage[1] | CTI [V] 50 drops | CTI [V] 100 drops |
|---|---|---|---|---|
| Comparative Example 1 | M1 | 0.00 | 600 | n.a |
| Comparative Example 2 | M1; 1% A-2 4% A-3 | 0.00 | 475 | n.a |
| LMC01 | M1 | 1 | 600 | n.a |
| LMC02 | M1 | 0.5 | 600 | n.a |
| LMC03 | M1 | 0.25 | 600 | n.a |
| LMC04 | M1 | 0.25 | 600 | n.a |
| LMC05 | M-1.1 | 0.000 | n.a. | n.a. |
| LMC06 | M-1.1 | 0.500 | n.a. | n.a. |
| LMC07 | M-1.1 | 0.250 | n.a. | n.a. |
| LMC08 | M-1.1 | 0.125 | n.a. | n.a. |
| LMC09 | M-1.1 | 0.500 | n.a. | n.a. |
| LMC10 | M-1.2 | 0.000 | 600 | 525 |
| LMC11 | M-1.2 | 0.500 | 600 | 550 |
| LMC12 | M-1.2 | 0.250 | 600 | 550 |
| LMC13 | M-1.2 | 0.125 | 600 | 600 |
| LMC14 | M-1.2 | 0.500 | 600 | 550 |
| LMC18 | M-2.1 | 0.500 | 275 | 250 |
| LMC19 | M-2.1 | 0.250 | 250 | 250 |
| LMC20 | M-2.1 | 0.125 | 275 | 225 |
| LMC21 | M-2.1 | 0.500 | 275 | 250 |
| LMC22 | M-2.2 | 0.125 | 500 | 500 |
| LMC23 | M-2.2 | 0.500 | 600 | 600 |
| LMC24 | M-2.2 | 1.000 | 550 | 500 |
| LMC25 | M-2.2 | 0.500 | 550 | 500 |

[1]with respect to the total amount of laser-markable composition.
n.a. is not available.

Table 4 clearly shows that application of laser-marking additives comprising antimony (comparative example 2) leads to a decrease of CTI value with respect to the composition that does not comprise a laser-marking additive (comparative example 1), whereas the employment of a laser-marking additive according to the invention does hardly influence the CTI value.

Flammability Studies

UL 94 test was performed on various samples. This is a plastics flammability standard. The standard classifies plastics according to how they burn in various orientations and thicknesses. From lowest (least flame-retardant) to highest (most flame-retardant), the measured classifications are:

V2 burning stops within 30 seconds on a vertical specimen; drips of flaming particles are allowed.

V0: burning stops within 10 seconds on a vertical specimen; drips of particles allowed as long as they are not inflamed.

The results are shown in Table 5.

TABLE 5

Flammability experiments

| Sample | Sample description | Bi$_2$O$_3$ content in weight percentage[1] | [2])UL94V | [3])UL94V |
|---|---|---|---|---|
| Comparative Example 1 | matrix polymer: M1 | 0.00 | | |
| Comparative Example 2 | matrix polymer: M1; 1% A-2 4% A-3 | 0.00 | | |
| LMC05 | M-1.1 | 0.000 | V2 | V2 |
| LMC06 | M-1.1 | 0.500 | V2 | V2 |
| LMC07 | M-1.1 | 0.250 | V2 | V2 |
| LMC08 | M-1.1 | 0.125 | V2 | V2 |
| LMC09 | M-1.1 | 0.500 | V2 | V2 |
| LMC10 | M-1.2 | 0.000 | V2 | V2 |
| LMC11 | M-1.2 | 0.500 | V2 | V2 |
| LMC12 | M-1.2 | 0.250 | V2 | V2 |

TABLE 5-continued

Flammability experiments

| Sample | Sample description | $Bi_2O_3$ content in weight percentage[1] | [2])UL94V | [3])UL94V |
|---|---|---|---|---|
| LMC13 | M-1.2 | 0.125 | V2 | V2 |
| LMC14 | M-1.2 | 0.500 | V2 | V2 |
| LMC22 | M-2.2 | 0.125 | V0 | V0 |
| LMC23 | M-2.2 | 0.500 | V0 | V0 |
| LMC24 | M-2.2 | 1.000 | V0 | V0 |
| LMC25 | M-2.2 | 0.500 | V0 | V0 |

[1]with respect to the total amount of laser-markable composition.
[2])UL94V Thickness 0.57 mm; conditioning 48 hrs 23° C./50% RH
[3])UL94V Thickness 0.57 mm; conditioning 168 hrs 70° C.

Also Table 5 shows that upon addition of the laser-marking additive according to the invention the flammability test remains the same.

The invention claimed is:

1. A laser-marking additive comprising:
a functionalized carrier polymer, and
a bismuth-containing compound melt-blended with the functionalized carrier polymer, wherein
the bismuth-containing compound is at least one selected from the group consisting of $Bi_2O_3$ and Bi-citrate, and wherein
the functionalized carrier polymer comprises an amount of functional groups based on total weight of the functionalized polymer and
the bismuth-containing compound of 0.01 to 50 wt % sufficient to achieve no discoloration of a thermoplastic matrix polymer when the laser-marking additive is melt-blended with the thermoplastic matrix polymer at a temperature above 220° C., wherein
the laser-marking additive is antimony-free and halogen-free.

2. The laser-marking additive according to claim 1, wherein the functionalized carrier polymer is a grafted polyethylene or grafted polypropylene.

3. The laser-marking additive according to claim 1, wherein the functional group is at least one selected from the group consisting of maleic anhydride and epoxy.

4. The laser-marking additive according to claim 1, wherein the functionalized carrier polymer comprises at least 0.05 wt % of functional groups.

5. The laser-marking additive according to claim 1, wherein the functionalized carrier polymer comprises at most 30 wt % functional groups.

6. The laser-marking additive according to claim 1, wherein the functionalized carrier polymer comprises at least 0.1 wt % of functional groups.

7. The laser-marking additive according to claim 1, wherein the functionalized carrier polymer comprises at most 20 wt % of functional groups.

8. A laser-markable composition comprising:
a thermoplastic matrix polymer having a melt-blending temperature of above 220° C.,
a laser-marking additive according to claim 1 melt-blended with the thermoplastic matrix polymer to form a laser-markable composition which exhibits no discoloration due to the presence of the bismuth-containing compound.

9. The laser-markable composition according to claim 8, wherein the thermoplastic matrix polymer is at least one polymer selected from the group consisting of polyamides, polyesters and polycarbonates.

10. The laser-markable composition according to claim 8, wherein the amount of bismuth is from 0.05 to 2 wt %, based on total weight of the composition.

11. The laser-markable composition according to claim 8, which additionally comprises a further thermoplastic polymer melt-blended with the thermoplastic matrix polymer.

12. A molded part comprising the laser-markable composition according to claim 8.

13. A film formed of the laser-markable composition according to claim 8.

14. A method of preparing a laser-marking additive according to claim 1, which comprises melt-blending the functionalized polymer with the bismuth-containing compound.

15. The method of claim 14, wherein melt-blending is effected at a temperature of at least 220° C.

16. A method of forming a laser-markable composition which comprises which comprises melt-blending the laser-marking additive according to claim 1 with a thermoplastic matrix polymer at a melt-blending temperature of at least 220° C. thereby forming a laser-markable composition with no discoloration due to the presence of the bismuth-containing compound.

* * * * *